Aug. 23, 1938.    H. GUIRAUD    2,127,814
TRANSMITTING GEAR WITH VARIABLE SPEED
Filed June 12, 1937

INVENTOR:
HENRY GUIRAUD
BY Haseltine Lake & Co. ATTORNEYS

Patented Aug. 23, 1938

2,127,814

UNITED STATES PATENT OFFICE 2,127,814

TRANSMITTING GEAR WITH VARIABLE SPEED

Henry Guiraud, Nancy, France

Application June 12, 1937, Serial No. 147,839
In France May 20, 1937

3 Claims. (Cl. 74—260)

This invention has for its object a transmitting gear with variable speed which can be used in connection with motor vehicles and for any other mechanical purposes.

The said apparatus essentially comprises a driving shaft, a driven shaft and a planet wheel-carrier having the same axis of revolution, the said carrier supporting one or more planet wheels every one of which comprises a toothed pinion meshing normally with a sun-wheel connected to the driven shaft and a drum the diameter of which is smaller than the one of the said pinion, the said drum being provided with a certain number of helical threads cooperating with corresponding threads carried by a sun-drum connected to the driving shaft. The apparatus moreover comprises driving means consisting of a pinion connected to every planet wheel, a toothed wheel loosely mounted on the driving shaft and a governor between the said driving shaft and the said wheel which allows a slight alteration in the orientation of the said wheel relatively to the said shaft while this wheel is driven by the latter.

In virtue of this arrangement and the fact that the number and the pitch of threads of both drums are conveniently determined, the angular shifting of the said wheel in one direction has for effect to maintain the threads of the planet drums with play between those of the sun-drum without allowing the said threads to bear the one against the other, so that the planets may roll freely about the driving and driven sun-wheels without transmitting any power from one shaft to the other, while the angular shifting of the driving wheel in the opposite direction has for effect to bring in contact, with a greater or smaller pressure, the threads of the driving drum with those of the planet drums, so that there will be imparted to the train of planet-wheels a moment which is transmitted by the said train to the driven sun-wheel, and to the driven shaft in a quite gradual and continuous manner.

The shifting of the governor elements may be obtained automatically through the changes of speed of the driving shaft so that the driven shaft will not have any driving torque imparted thereto, that is to say will be out of gear with the driving shaft as long as the rate of revolution of the latter is under a predetermined limit, whilst, the said rate of revolution being once attained or exceeded, the shifting of the driving elements secures the gradual driving of the driven shaft at a speed continuously varying until the integral coupling of the said driven shaft with the driving shaft is obtained.

An embodiment of a variable speed transmitting gear according to the invention is shown by way of example in the accompanying drawing in which.

Figure 1:
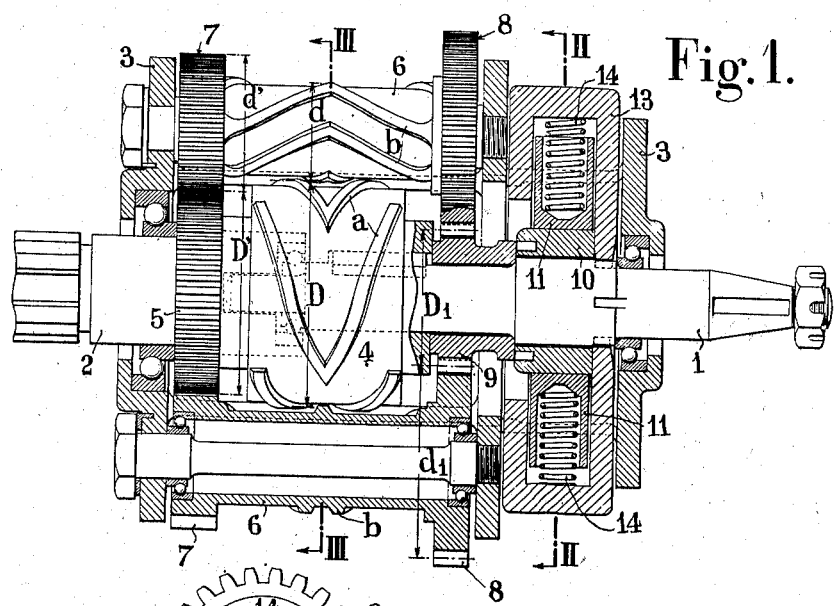
Fig. 1 is an axial section.
Figure 2:
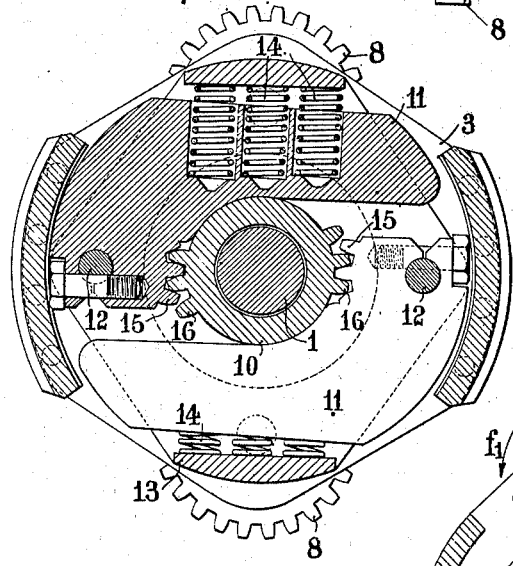
Figs. 2 and 3 are cross sections made according to lines II—II and III—III of Fig. 1, the apparatus being at rest.
Figure 3:
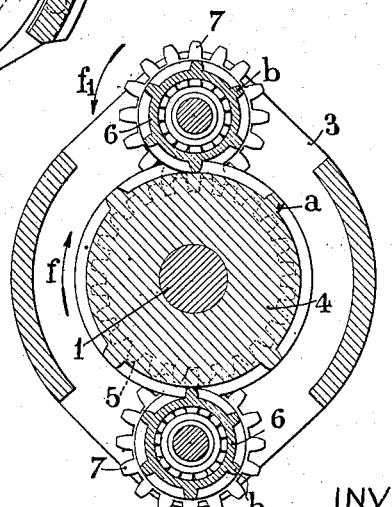

1 denotes the driving shaft, 2 the driven shaft both mounted in axial alinement, and 3, the planet-gear carrier, in the form of a cage, which may revolve about the axis common to the said shafts.

To the shaft 1 is secured a sun-drum 4 provided for instance with four helical threads $a$ in the form of bevels and to the shaft 2 is secured a toothed sun-wheel 5. On the planet-gear carrier are mounted two symmetrically arranged planet-wheels each one of which comprises a cylindrical drum 6 provided with threads $b$ corresponding to the threads $a$, and a pinion 7 meshing with the wheel 5.

It is to be observed that the diameter $d$ of the pitch line of the threads $b$ is smaller than the one $d'$ of the teeth of the pinion 7 and that consequently the diameter $D$ of the drum 4 is larger than the one $D'$ of the wheel 5:

$$d<d' \text{ and } D>D' \text{ or } \frac{d}{D}<\frac{d'}{D'}$$

Moreover, every planet-gear comprises a pinion 8 gearing with a toothed sun-wheel 9 connected to a sleeve 10 which is freely mounted on the driving shaft 1.

The said gears 8 and 9 are provided with a number of teeth which is proportional to the diameters $d_1$ and $D_1$ of their pitch lines, but their ratio is different from that of the diameters $d$ and $D$ of the drums. For instance, in the embodiment as represented, the sun drum 4 is provided with four threads $a$ and the wheel 9 with sixteen teeth, whilst every planet wheel has six threads $b$ and twenty-four teeth gearing with the said wheel 9:

$$\frac{6}{4}=\frac{24}{16}=\frac{d_1}{D_1}>\frac{d}{D}$$

The drawing shows that the threads $a$ and $b$ mesh together with a great play, whilst the other gears mesh with a normal play.

In order to modify the orientation of the wheel 9 upon the driving shaft 1, oscillating governor arms 11 mounted on spindles 12 carried by a support 13 connected to the driving shaft have been provided for; every one of the said arms is submitted to the combined action of the centrifugal power and of return springs 14, and is provided with a few teeth 15 gearing with corresponding teeth 16 of the sleeve 10. It follows that as long as the driving shaft is immobilized or that the speed of the same is under a certain value $V_0$, the wheel 9 is orientated relatively to the said shaft and to the drum 4 in such manner that when the planet wheel carrier 3 rotates about the shaft 1, the pinions 8 roll normally on the wheel 9 and the threads $b$ pass freely between the threads $a$ without coming in contact with the latter.

On the contrary, when the speed of the shaft 1 exceeds $V_0$, the arms move apart to a sufficient extent to shift the wheel 9 relatively to the drum 4 in such manner that the threads $a$ and $b$ bear the one against the other.

It will be understood that, at the moment of starting, the driven shaft 2 being immobilized and submitted to a certain resisting moment and that, as the driving shaft 1 is set in rotation in the direction of the arrow $f$ at an increasing speed, the threads $a$ and $b$ first remain spaced apart and the planet wheels, driven through the medium of the device 9—16, revolve about the wheel 5, the planet wheel carrier 3 turning loosely in the reverse direction to the arrow $f$ without the driven shaft being submitted to any other motive moment except the one which results from the reaction produced by the inertia of the parts set in rotation at an increasing speed.

When the said speed is high enough to cause the arms 11 to move apart, the wheel 9 is shifted backwards relatively to the shaft 1 and the planet wheels move according to a corresponding angle about their axes in the direction of the arrow $f_1$, so that the threads $b$ will come in contact with the threads $a$.

Under the influence of the centrifugal governor and of the variations of the motive and resisting moments, the pressure exerted by the teeth of the wheel 9 upon the teeth of the pinions 8 passes in a variable proportion upon the helical threads $b$, $a$, determining thereby a more or less considerable and always very gradual and continuous drive of the driven shaft, whereas the said threads are continuously in mesh, as such is the case in an ordinary gearing.

When the driven shaft at last rotates at the same speed as the driving shaft, the power is integrally transmitted to the driven shaft through the threads $a$ and $b$ of the drums 6 which still bear continuously the one against the other; the planet-wheel carrier and the planet-wheels turning as a whole with the shafts 1 and 2.

When, under the action of the resistance, the speed of the motor and with it the centrifugal power of the governor tend to diminish, the pressure exerted upon teeth of the pinion 9 increases to the detriment of the one which is exerted between the helical threads $a$ and $b$, thereby allowing the planet wheels to rotate about their axes and to determine accordingly an automatic modification of the ratio between the speed of the driving shaft and the speed of the driven shaft, the said modification being proportional to the resistance opposed by the said driven shaft.

The apparatus therefore automatically secures a gradual driving, an integral transmission of the speed and of the power during the normal run and the throwing out of gear every time the motor slows down.

It is to be observed that the apparatus comprises but a little number of parts and may be very strongly built, with a reduced weight and small sizes.

The constructive arrangements of the various parts of the apparatus as represented in the drawing may of course vary without departing from the essential features of the invention. Thus particularly, it will be possible to vary the number of teeth of the gears 5, 7, 8, 9, to cut the same with spur or helical teeth, to vary also the number of helical threads provided on the drums 4 and 6 and the ratios between the diameters of all of these gears, provided the diameter of the drum 6 will always be slightly smaller than the one of the planet wheels 7.

I claim:

1. A transmitting gear with variable speed comprising a driving shaft, a driven shaft in axial alinement with the said driving shaft, a planet wheel-carrier freely mounted on the said shafts, a sun pinion freely mounted on the driving shaft, means connecting the said pinion with the said shaft and adapted for modifying the orientation of the one relatively to the other, a sun drum secured to the driving shaft and provided on its periphery with screw threads, a sun pinion secured to the driven shaft, at least one spindle on the planet wheel carrier and on the said spindle two planet pinions and one planet drum connected the one to the other, the said pinions meshing respectively with the said sun pinions on the driving and driven shafts, and the said planet drum being provided on its periphery with screw threads engaged with a great play between the threads of the said sun drum, the ratio between the diameters of the pitch line of the sun and planet drums being different from the ratio between the diameters of the pitch lines of the driven sun pinion and the corresponding planet pinion.

2. A transmitting gear with variable speed as claimed in claim 1 in which the ratio between the diameter of the sun drum and the diameter of the planet drums is larger than the ratio between the diameter of the pitch line of the sun pinion mounted on the driving shaft and the diameter of the pitch line of the corresponding planet pinions.

3. A transmitting gear with variable speed comprising a driving shaft, a driven shaft in axial alinement with the said driving shaft, a planet wheel carrier freely mounted on the said shafts, a sun pinion freely mounted on the driving shaft, a sun drum secured to the driving shaft and provided on its periphery with screw threads, a sun pinion secured to the driven shaft, at least one spindle on the planet wheel carrier and on the said spindle two planet pinions and one planet drum connected the one to the other, the said pinions meshing respectively with the said sun pinions on the driving and driven shafts, and the said planet drum being provided on its periphery with screw threads engaged with a great play between the threads of the said sun drum, the ratio between the diameters of the pitch lines of the sun and planet drums differing from the ratio between the diameters of the pitch lines of the driven sun pinion and of the corresponding planet pinions and means connecting the said driving shaft with the sun pinion freely mounted thereon, the said means comprising a plate secured to the driving shaft, governor arms radially movable on the said plate, springs acting on said masses, these being adapted to move apart under the action of centrifugal power in opposition to the action of the said springs, and a toothed sleeve connected to the said sun pinion, the said arms having teeth meshing with the said toothed sleeve so that their displacement determine a corresponding angular shifting of the said sun pinion relatively to the driving shaft.

HENRY GUIRAUD.